(12) United States Patent
Mallick et al.

(10) Patent No.: US 11,954,344 B2
(45) Date of Patent: Apr. 9, 2024

(54) HOST DEVICE COMPRISING LAYERED SOFTWARE ARCHITECTURE WITH AUTOMATED TIERING OF LOGICAL STORAGE DEVICES

(71) Applicant: EMC IP Holding Company LLC, Hopkinton, MA (US)

(72) Inventors: Sanjib Mallick, Bangalore (IN); Vinay G. Rao, Bangalore (IN); Jay Jung, Shrewsbury, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 196 days.

(21) Appl. No.: 17/388,096

(22) Filed: Jul. 29, 2021

(65) Prior Publication Data
US 2022/0404993 A1    Dec. 22, 2022

(30) Foreign Application Priority Data

Jun. 16, 2021  (IN) .............................. 202141026827

(51) Int. Cl.
*G06F 3/06*    (2006.01)
(52) U.S. Cl.
CPC .......... *G06F 3/0635* (2013.01); *G06F 3/0604* (2013.01); *G06F 3/0659* (2013.01);
(Continued)
(58) Field of Classification Search
CPC .... G06F 3/0635; G06F 3/0604; G06F 3/0659; G06F 3/0665; G06F 3/067; G06F 3/0683
See application file for complete search history.

(56) References Cited

U.S. PATENT DOCUMENTS 6,567,397 B1    5/2003  Campana et al.
6,687,746 B1    2/2004  Shuster et al.
(Continued)

FOREIGN PATENT DOCUMENTS

CN    103677927 B    2/2017
EP    1117028 A2    7/2001
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Eric Cardwell
(74) *Attorney, Agent, or Firm* — Ryan, Mason & Lewis, LLP

(57) ABSTRACT

An apparatus comprises at least one processing device. The at least one processing device is configured, for each of a plurality of logical storage devices of a storage system, to determine in a multi-path layer of a layered software stack of a host device a performance level for that logical storage device, to communicate the performance levels for respective ones of the logical storage devices from the multi-path layer of the layered software stack of the host device to at least one additional layer of the software stack above the multi-path layer, and to select particular ones of the logical storage devices for assignment to particular storage roles in the additional layer based at least in part on the communicated performance levels. The additional layer in some embodiments comprises an application layer configured to automatically select a particular one of the logical storage devices for a particular storage role.

20 Claims, 4 Drawing Sheets

(52) U.S. Cl.
CPC ............ *G06F 3/0665* (2013.01); *G06F 3/067* (2013.01); *G06F 3/0683* (2013.01)

(56) References Cited

U.S. PATENT DOCUMENTS

| | | | |
|---|---|---|---|
| 6,697,875 | B1 | 2/2004 | Wilson |
| 7,275,103 | B1 | 9/2007 | Thrasher et al. |
| 7,454,437 | B1 | 11/2008 | Lavallee et al. |
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1* | 3/2011 | Bappe .................. G06F 3/0689 711/149 |
| 7,925,872 | B2 | 4/2011 | Lai et al. |
| 8,209,515 | B2* | 6/2012 | Schott .................. G06F 9/5088 711/173 |
| 8,250,256 | B2 | 8/2012 | Ghosalkar et al. |
| 8,285,825 | B1 | 10/2012 | Nagaraj et al. |
| 8,825,919 | B1 | 9/2014 | Lim et al. |
| 8,832,334 | B2 | 9/2014 | Okita |
| 8,874,746 | B1 | 10/2014 | Gonzalez |
| 9,026,694 | B1 | 5/2015 | Davidson et al. |
| 9,201,803 | B1 | 12/2015 | Derbeko et al. |
| 9,258,242 | B1* | 2/2016 | Mallick .............. H04L 43/0888 |
| 9,400,611 | B1 | 7/2016 | Raizen |
| 9,430,368 | B1 | 8/2016 | Derbeko et al. |
| 9,594,780 | B1 | 3/2017 | Esposito et al. |
| 9,647,933 | B1 | 5/2017 | Tawri et al. |
| 9,672,160 | B1 | 6/2017 | Derbeko et al. |
| 9,778,852 | B1 | 10/2017 | Marshak et al. |
| 9,798,465 | B1* | 10/2017 | Labaj .................... G06F 3/0486 |
| 10,289,325 | B1 | 5/2019 | Bono |
| 10,353,714 | B1 | 7/2019 | Gokam et al. |
| 10,439,878 | B1 | 10/2019 | Tah et al. |
| 10,474,367 | B1 | 11/2019 | Mallick et al. |
| 10,476,960 | B1 | 11/2019 | Rao et al. |
| 10,521,369 | B1 | 12/2019 | Mallick et al. |
| 10,606,496 | B1 | 3/2020 | Mallick et al. |
| 10,637,917 | B2 | 4/2020 | Mallick et al. |
| 10,652,206 | B1 | 5/2020 | Pusalkar et al. |
| 10,754,572 | B2 | 8/2020 | Kumar et al. |
| 10,757,189 | B2 | 8/2020 | Mallick et al. |
| 10,764,371 | B2 | 9/2020 | Rao et al. |
| 10,789,006 | B1 | 9/2020 | Gokam et al. |
| 10,817,181 | B2 | 10/2020 | Mallick et al. |
| 10,838,648 | B2 | 11/2020 | Sharma et al. |
| 10,880,217 | B2 | 12/2020 | Mallick et al. |
| 10,884,935 | B1 | 1/2021 | Doddaiah |
| 10,911,402 | B2 | 2/2021 | Pusalkar et al. |
| 2002/0023151 | A1 | 2/2002 | Iwatani |
| 2002/0103923 | A1 | 8/2002 | Cherian et al. |
| 2004/0010563 | A1 | 1/2004 | Forte et al. |
| 2006/0026346 | A1 | 2/2006 | Kadoiri et al. |
| 2006/0277383 | A1 | 12/2006 | Hayden et al. |
| 2007/0174849 | A1 | 7/2007 | Cheung et al. |
| 2008/0043973 | A1 | 2/2008 | Lai et al. |
| 2008/0201458 | A1 | 8/2008 | Salli |
| 2008/0301332 | A1 | 12/2008 | Butler et al. |
| 2009/0259749 | A1 | 10/2009 | Barrett et al. |
| 2010/0313063 | A1 | 12/2010 | Venkataraja et al. |
| 2011/0197027 | A1 | 8/2011 | Balasubramanian et al. |
| 2011/0296230 | A1 | 12/2011 | Chen et al. |
| 2012/0102369 | A1 | 4/2012 | Hiltunen et al. |
| 2012/0246345 | A1 | 9/2012 | Contreras et al. |
| 2013/0117766 | A1 | 5/2013 | Bax et al. |
| 2013/0262649 | A1* | 10/2013 | Shimmitsu ............ G06F 3/0659 709/223 |
| 2013/0339551 | A1 | 12/2013 | Flanagan et al. |
| 2014/0105068 | A1 | 4/2014 | Xu |
| 2015/0222705 | A1 | 8/2015 | Stephens |
| 2015/0242134 | A1 | 8/2015 | Takada et al. |
| 2016/0092136 | A1 | 3/2016 | Balakrishnan et al. |
| 2016/0117113 | A1 | 4/2016 | Li et al. |
| 2016/0335003 | A1 | 11/2016 | Ahmed et al. |
| 2017/0235507 | A1 | 8/2017 | Sinha et al. |
| 2018/0189635 | A1 | 7/2018 | Olarig et al. |
| 2018/0253256 | A1 | 9/2018 | Bharadwaj |
| 2018/0314427 | A1* | 11/2018 | Dalmatov ............... G06F 3/061 |
| 2018/0317101 | A1 | 11/2018 | Koue |
| 2019/0095299 | A1 | 3/2019 | Liu et al. |
| 2019/0108888 | A1 | 4/2019 | Sarkar et al. |
| 2019/0334987 | A1 | 10/2019 | Mallick et al. |
| 2020/0021653 | A1 | 1/2020 | Rao et al. |
| 2020/0034460 | A1* | 1/2020 | Tonnesen ............... G06F 16/217 |
| 2020/0097203 | A1* | 3/2020 | Mallick .................. G06F 13/102 |
| 2020/0106698 | A1 | 4/2020 | Rao et al. |
| 2020/0110552 | A1 | 4/2020 | Kumar et al. |
| 2020/0112608 | A1 | 4/2020 | Patel et al. |
| 2020/0192588 | A1 | 6/2020 | Kumar et al. |
| 2020/0204475 | A1 | 6/2020 | Mallick et al. |
| 2020/0204495 | A1 | 6/2020 | Mallick et al. |
| 2020/0213274 | A1 | 7/2020 | Pusalkar et al. |
| 2020/0241890 | A1 | 7/2020 | Mallick et al. |
| 2020/0314218 | A1 | 10/2020 | Kumar et al. |
| 2020/0348860 | A1 | 11/2020 | Mallick et al. |
| 2020/0348861 | A1 | 11/2020 | Marappan et al. |
| 2020/0348869 | A1 | 11/2020 | Gokam |
| 2020/0349094 | A1 | 11/2020 | Smith et al. |
| 2020/0363985 | A1 | 11/2020 | Gokam et al. |
| 2020/0372401 | A1 | 11/2020 | Mallick et al. |
| 2021/0019054 | A1 | 1/2021 | Anchi et al. |
| 2021/0026551 | A1 | 1/2021 | Tidke et al. |
| 2021/0026650 | A1 | 1/2021 | Rao et al. |
| 2021/0157502 | A1 | 5/2021 | Rao et al. |
| 2021/0181965 | A1 | 6/2021 | Anchi et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.
VMware, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMware, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.

* cited by examiner

PERFORMANCE INFORMATION MAINTAINED BY STORAGE ARRAY FOR LOGICAL STORAGE DEVICES

| LUN 1 | SLO LEVEL ID | PERFORMANCE MEASUREMENTS |
| LUN 2 | SLO LEVEL ID | PERFORMANCE MEASUREMENTS |
| ... | | |
| LUN X | SLO LEVEL ID | PERFORMANCE MEASUREMENTS |

FIG. 4

HOST DEVICE COMPRISING LAYERED SOFTWARE ARCHITECTURE WITH AUTOMATED TIERING OF LOGICAL STORAGE DEVICES

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. The IO operations include read and write operations directed to particular logical storage volumes or other logical storage devices of the storage system. Managing such logical storage devices under conventional practice can be unduly complicated. For example, certain management functions involving logical storage devices can require substantial communication between host administrators and storage administrators.

SUMMARY

Illustrative embodiments provide techniques for automated tiering of logical storage volumes or other types of logical storage devices in a layered software architecture of a host device based at least in part on service level objectives (SLOs) or other performance levels determined for respective ones of the logical storage devices. Such techniques in some embodiments are implemented at least in part in a multi-path layer of one or more host devices that communicate with a storage array or other type of storage system via a storage area network (SAN) or other type of network. These techniques can considerably facilitate the management of logical storage devices. For example, such techniques can avoid the need for communication between host administrators and storage administrators in many situations in which it would otherwise be required.

The multi-path layer illustratively comprises at least one multi-path input-output (MPIO) driver configured to process IO operations of at least one host device. Other types of host drivers can be used in place of or in addition to one or more MPIO drivers. At least one application layer is arranged above the multi-path layer in the layered software architecture of the host device, and processes SLOs or other performance levels made available to it for respective logical storage devices by the multi-path layer.

This determination of SLOs or other performance levels in a multi-path layer for respective logical storage devices, coupled with exposure of those performance levels by the multi-path layer to one or more overlying application layers of the host device software stack for use in assigning different storage roles to the respective devices, is an example of what is more generally referred to herein as "automated device tiering."

Such techniques not only advantageously avoid the need for excessive administrator communication, but also significantly enhance the performance of applications and their associated file systems that utilize the logical storage devices.

In one embodiment, an apparatus comprises at least one processing device that includes a processor and a memory, with the processor being coupled to the memory. The at least one processing device is configured, for each of a plurality of logical storage devices of a storage system, to determine in a multi-path layer of a layered software stack of a host device a performance level for that logical storage device, to communicate the performance levels for respective ones of the logical storage devices from the multi-path layer of the layered software stack of the host device to at least one additional layer of the software stack above the multi-path layer, and to select particular ones of the logical storage devices for assignment to particular storage roles in the at least one additional layer based at least in part on the communicated performance levels.

The additional layer in some embodiments comprises an application layer configured to automatically select a particular one of the logical storage devices for use with a particular storage role of that application based at least in part on the performance levels communicated for respective ones of the logical storage devices from the multi-path layer. Other types of layers can be used in other embodiments.

The at least one processing device illustratively comprises at least a portion of the host device, and in some embodiments can comprise portions of one or more other devices, such as an associated host management station.

In some embodiments, determining the performance level for a given one of the logical storage devices illustratively comprises measuring response times for respective ones of multiple read operations directed by the multi-path layer to the given logical storage device, and determining the performance level based at least in part on the measured response times. Other types of performance metrics can be used in addition to or in place of response times in these and other embodiments.

Additionally or alternatively, determining the performance level for a given one of the logical storage devices illustratively comprises obtaining an SLO for the given logical storage device from the storage system, measuring read performance for the given logical storage device, comparing the measured read performance to the SLO, and determining the performance level based at least in part on a result of the comparing.

In some embodiments, obtaining the SLO for the given logical storage device from the storage system comprises sending a designated command to the storage system, and receiving the SLO for the given logical storage device in response to the command. The command is illustratively sent from the multi-path layer to the storage system utilizing a designated storage access protocol. For example, the command can comprise a log sense command, a mode sense command, a "vendor unique command" or VU command, or combinations of multiple instances of these or other commands, in an otherwise standardized command format of the storage access protocol.

As indicated above, the at least one additional layer of the software stack above the multi-path layer in some embodiments comprises an application layer. At least one application of the application layer is illustratively configured to automatically select a particular one of the logical storage devices for use with a particular storage role of that application based at least in part on the performance levels communicated for respective ones of the logical storage devices from the multi-path layer.

Additionally or alternatively, at least one application of the application layer is illustratively configured to automatically select a first one of the logical storage devices having a first performance level for storing one or more application files of a first type and to automatically select a second one of the logical storage devices having a second performance level lower than the first performance level for storing one or more application files of a second type different than the first type.

In some embodiments, the application comprises a database application, the one or more application files of the first type comprise data files of the database application, and the one or more application files of the second type comprise log files of the database application.

In other embodiments, the application comprises a software-defined storage application, the one or more application files of the first type comprise data files of the software-defined storage application, and the one or more application files of the second type comprise control files of the software-defined storage application.

Communicating the performance levels for respective ones of the logical storage devices from the multi-path layer of the layered software stack of the host device to at least one additional layer of the software stack in some embodiments comprises publishing the performance levels from the multi-path layer to the at least one additional layer. A wide variety of other types of communication techniques can be used to convey the performance levels from the multi-path layer to the at least one additional layer.

In some embodiments, determining the performance level for a given one of the logical storage devices comprises obtaining fabric performance impact notifications (FPINs) characterizing at least one switch fabric of a network interconnecting the host device and the storage system, and determining the performance level based at least in part on the obtained FPINS.

Additionally or alternatively, the at least one processing device in some embodiments is further configured to detect a change in an SLO assigned to a given one of the logical storage devices by the storage system, and to communicate the detected change in the SLO assigned to the given logical storage device by the storage system from the multi-path layer of the layered software stack of the host device to at least one additional layer of the software stack above the multi-path layer.

These and other illustrative embodiments include, without limitation, apparatus, systems, methods and computer program products comprising processor-readable storage media.

BRIEF DESCRIPTION OF THE DRAWINGS

FIG. 4 shows an example of performance information maintained by a storage system for use in automated device tiering in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
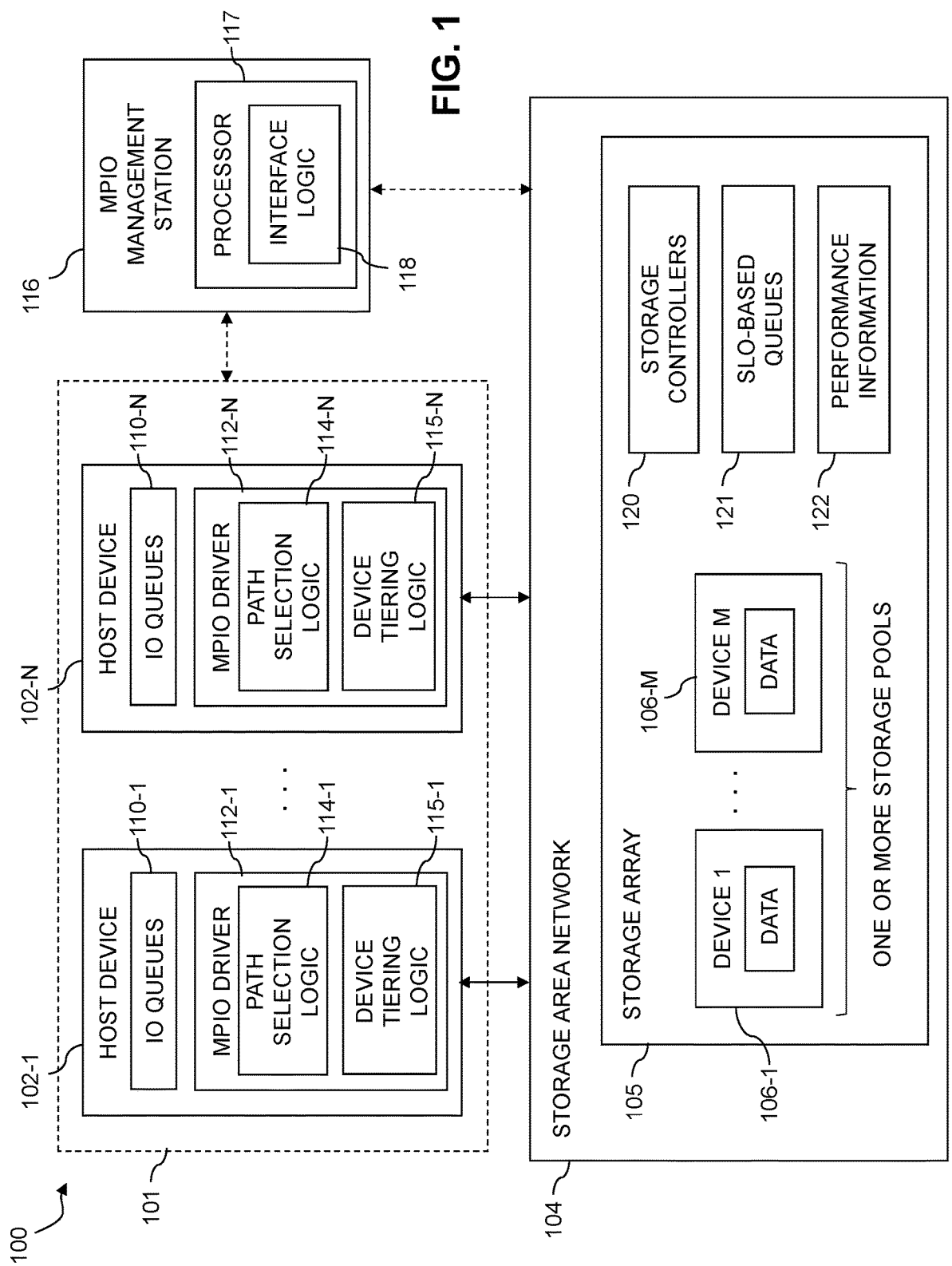
FIG. 1 is a block diagram of an information processing system configured with functionality for automated device tiering in a multi-path layer of a host device in an illustrative embodiment.

FIG. 1 shows an information processing system 100 configured in accordance with an illustrative embodiment. The information processing system 100 comprises a computer system 101 that includes a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects.

The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for automated device tiering. Such functionality is provided at least in part using respective instances of device tiering logic 115-1, . . . 115-N implemented within the MPIO drivers 112.

The host devices 102 are configured in accordance with a layered software architecture comprising a software stack having multiple distinct layers. The multi-path layer is illustratively part of the layered software stack of the host devices 102. The layered software stack illustratively includes one or more layers below the multi-path layer, such as one or more device driver layers, and one or more layers above the multi-path layer, such as one or more application layers. Additional or alternative layers can be used in a layered software stack of the host devices 102 in other embodiments. Also, it is to be appreciated that each of the host devices 102 generally has the same layered software stack as each of the other ones of the host devices 102. Accordingly, references herein to a "multi-path layer" are intended to be broadly construed, and can refer, for example, to a particular software stack layer in only a single one of the host devices 102, or to a particular software stack layer that spans multiple ones of the host devices 102. A given one of the MPIO drivers 112 therefore illustratively forms at least a portion of a multi-path layer of the layered software stack of at least its corresponding one of the host devices 102.

The MPIO drivers 112 may comprise, for example, otherwise conventional MPIO drivers, such as PowerPath® drivers from Dell Technologies, suitably modified in the manner disclosed herein to provide functionality for automated device tiering. Other types of MPIO drivers from other driver vendors may be suitably modified to incorporate functionality for automated device tiering as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

In the FIG. 1 embodiment, the storage array 105 comprises a plurality of storage controllers 120, one or more sets of SLO-based queues 121, and one or more instances of performance information 122.

The storage controllers 120 illustratively control the processing of IO operations received in the storage array 105 from the host devices 102. For example, the storage controllers 120 illustratively manage the processing of read and write commands directed by the MPIO drivers 112 to particular ones of the storage devices 106.

The SLO-based queues 121 illustratively comprise respective IO operation priority queues, and may be implemented as respective portions of a persistent memory of the storage array 105. The storage controllers 120 in some embodiments implement one or more response time control modules that are used to implement storage array based adjustments in response time for particular IO operations based at least in part on SLO information stored by the storage array 105 in its persistent memory. The response time control module is assumed to operate in conjunction with the SLO-based queues 121.

The storage array 105 illustratively utilizes its SLO-based queues 121 to provide different levels of performance for different IO operations. For example, the SLO-based queues 121 illustratively may have respective different SLO levels, such as Diamond, Gold, Silver and Bronze, in this example arranged from a highest SLO to a lowest SLO, with higher SLOs having better response times than lower SLOs. The storage array 105 may be configured to provide different SLOs for different ones of the IO operations by assigning different ones of the IO operations to different ones of the SLO-based queues 121. The SLO-based queues 121 are illustratively associated with respective SLOs for processing of IO operations in the storage array 105. Process tags may be used in assigning different ones of the IO operations to different ones of the SLO-based queues 121, as disclosed in U.S. Pat. No. 10,474,367, entitled "Storage System with Input-Output Performance Control Utilizing Application Process Detection," which is incorporated by reference herein. However, use of process tags is not required, and other techniques can be used to assign particular IO operations received in the storage array 105 to particular ones of the SLO-based queues 121.

The performance information 122 is illustratively maintained by the storage array 105 for respective LUNs or other logical storage devices, and can be arranged, for example, in the manner illustrated in the example of FIG. 4, or utilizing other types and arrangements of tables or other data structures. The performance information 122 is therefore also referred to herein as "storage-side performance information." Such storage-side performance information is illustratively used in combination with host-side performance information maintained by the MPIO drivers 112 in implementing automated device tiering as disclosed herein.

It is assumed that the MPIO drivers 112 of the respective host devices 102 can read or otherwise obtain at least portions of the performance information 122 directly or indirectly from the storage array 105.

For example, at least portions of the performance information 122 can be obtained by the host device 102-1 from the storage array 105 utilizing an in-band communication mechanism in which one or more predetermined commands in a designated storage protocol are sent from the host device 102-1 to the storage array 105. Such predetermined commands can comprise, for example, a log sense command, a mode sense command, a "vendor unique command" or VU command, or combinations of multiple instances of these or other commands, in an otherwise standardized command format, such as a SCSI format or other type of format.

Additionally or alternatively, at least portions of the performance information 122 can be obtained by the host device 102-1 from the storage array 105 utilizing an out-of-band communication mechanism. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Other components not explicitly shown in the figure, such as one or more storage caches, may additionally or alternatively be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

As indicated above, the MPIO driver 112-1 illustratively comprises at least a portion of a multi-path layer of a layered software stack of its corresponding host device 102-1. The MPIO driver 112-1 in some embodiments is configured, for each of a plurality of logical storage devices of the storage array 105, to determine in the multi-path layer of the layered software stack of host device 102-1 a performance level for that logical storage device, to communicate the performance levels for respective ones of the logical storage devices from the multi-path layer of the layered software stack of the host device 102-1 to at least one additional layer of the software stack above the multi-path layer, and to select particular ones of the logical storage devices for assignment to particular storage roles in the at least one additional layer based at least in part on the communicated performance levels.

In some embodiments, at least portions of the above-noted operations can be performed at least in part by other components of the host device 102-1 or by other processing devices, such as the MPIO management station 116.

Figure 2:
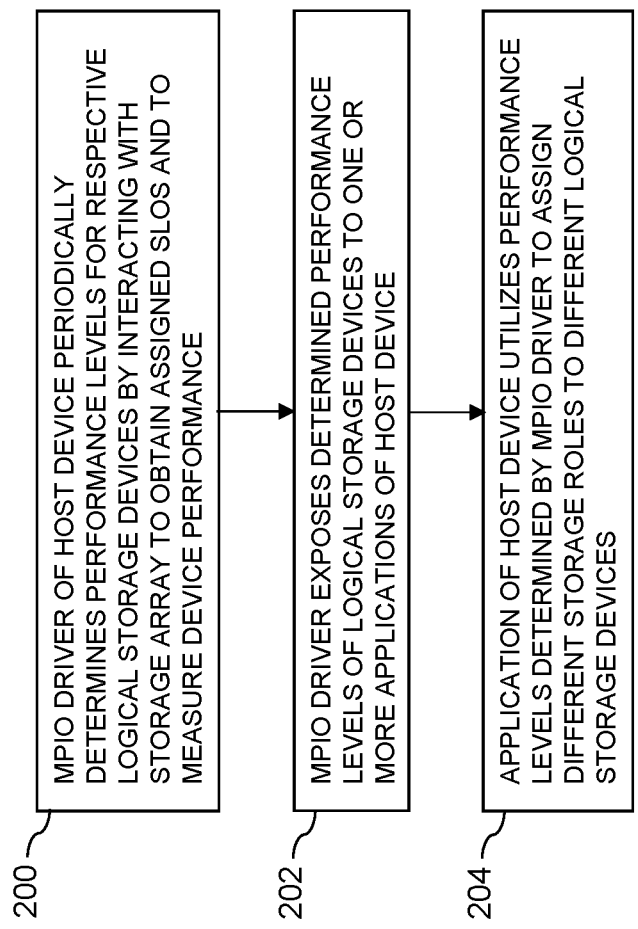
FIG. 2 is a flow diagram of a process for automated device tiering in a multi-path layer of a host device in an illustrative embodiment.

An example of a process illustrating one possible implementation of the above-noted functionality is illustrated in the flow diagram of FIG. 2.

Other MPIO drivers 112 on other host devices 102 are configured in a similar manner to provide automated device tiering functionality as disclosed herein.

In some embodiments, the MPIO driver 112-1 determines performance levels for respective ones of the logical storage devices at least in part by interacting with the storage array 105 to obtain at least portions of the storage-side performance information 122 maintained by storage array 105 in conjunction with processing of IO operations directed to the storage array 105 by host device 102-1 over SAN 104. Such performance information 122 can comprise SLOs for respective ones of the logical storage devices, as the term "performance information" is broadly used herein. Accordingly, the MPIO driver 112-1 in some embodiments determines performance levels for respective logical storage devices at least in part by obtaining the SLOs for those logical storage devices from the storage array 105, possibly in conjunction with obtaining performance measurements made by the storage array 105 for those logical storage devices, and may further generate its own performance measurements.

An example of a set of performance information 122 maintained by the storage array 105 for respective LUNs or other logical storage devices is illustrated in FIG. 4. It is assumed that the storage array 105 maintains similar performance information for each of at least a subset of the logical storage devices of the storage array 105.

The above-noted additional layer in some embodiments comprises an application layer configured to automatically select a particular one of the logical storage devices for use with a particular storage role of that application based at least in part on the performance levels communicated for respective ones of the logical storage devices from the MPIO driver 112-1 of the multi-path layer. Other types of additional layers can be used in other embodiments in place of or in addition to an application layer.

In some embodiments, the MPIO driver 112-1 determining the performance level for a given one of the logical storage devices more particularly involves the MPIO driver 112-1 measuring response times for respective ones of multiple read operations directed by the MPIO driver 112-1 to the given logical storage device, and the MPIO driver 112-1 determining the performance level based at least in part on the measured response times. Other types of performance metrics can be used in addition to or in place of response times in these and other embodiments.

Additionally or alternatively, the MPIO driver 112-1 determining the performance level for a given one of the logical storage devices illustratively involves the MPIO driver 112-1 obtaining an SLO for the given logical storage device from the storage array 105, the MPIO driver 112-1 measuring read performance for the given logical storage device, the MPIO driver 112-1 comparing the measured read performance to the SLO, and the MPIO driver 112-1 determining the performance level based at least in part on a result of the comparing.

In some embodiments, the MPIO driver 112-1 obtaining the SLO for the given logical storage device from the storage array 105 illustratively involves the MPIO driver 112-1 sending a designated command to the storage array 105, and the MPIO driver 112-1 receiving the SLO for the given logical storage device from the storage array 105 in response to the command. The command is illustratively sent from the MPIO driver 112-1 to the storage array 105 utilizing a designated storage access protocol, such as a SCSI or NVMe protocol. For example, the command can comprise a log sense command, a mode sense command, a "vendor unique command" or VU command, or combinations of multiple instances of these or other commands, in an otherwise standardized command format of the storage access protocol.

In determining performance levels for respective logical storage devices in the manner described above, a wide variety of different arrangements of commands may be used, as well as numerous associated timing techniques for repeatedly sending such commands from the host device 102-1 to the storage array 105. A "command" as the term is broadly used herein can comprise a combination of multiple distinct commands, such as respective different commands for different ones of a plurality of logical storage devices. Separate commands are utilized in some embodiments to obtain performance information for respective logical storage devices. In other embodiments, a single command can be sent to obtain performance information for multiple logical storage devices. These and other references herein to sending a command from a host device to a storage array, to obtain performance information for one or more logical storage devices, are intended to be broadly construed.

As indicated above, the at least one additional layer of the software stack above the multi-path layer in some embodiments comprises an application layer. At least one application of the application layer is illustratively configured to automatically select a particular one of the logical storage devices for use with a particular storage role of that application based at least in part on the performance levels communicated for respective ones of the logical storage devices from MPIO driver 112-1.

Additionally or alternatively, at least one application of the application layer is illustratively configured to automatically select a first one of the logical storage devices having a first performance level for storing one or more application files of a first type and to automatically select a second one of the logical storage devices having a second performance level lower than the first performance level for storing one or more application files of a second type different than the first type.

In some embodiments, the application comprises a database application, the one or more application files of the first type comprise data files of the database application, and the one or more application files of the second type comprise log files of the database application. An example of such a database application is an Oracle database application. Other examples include MS SQL applications, EPIC applications, etc.

In other embodiments, the application comprises a software-defined storage application, the one or more application files of the first type comprise data files of the software-defined storage application, and the one or more application files of the second type comprise control files of the software-defined storage application. An example of such a software-defined storage application is a software-defined network-attached storage (SDNAS) application. The SDNAS application in some embodiments illustratively manages files for higher-level applications that use those files. It may itself establish SLOs for different files of different higher-level applications. For example, the SDNAS application may be configured to allow users to select a higher performing SLO (e.g., Diamond) for files of certain time-sensitive applications, and lower SLOs for files of other applications.

The MPIO driver 112-1 in communicating the performance levels for respective ones of the logical storage devices from the multi-path layer of the layered software stack of the host device 102-1 to at least one additional layer of the software stack in some embodiments more particularly publishes the performance levels to the at least one additional layer. A wide variety of other types of communication techniques can be used to convey the performance levels from the multi-path layer to the at least one additional layer. The term "communicating" as used herein is intended to be broadly construed, so as to encompass, for example, publishing, transmitting, conveying, exposing or otherwise making available the corresponding information to the additional layer. For example, in some embodiments, communicating the performance levels can involve the MPIO driver 112-1 making an interface available through which the additional layer can read or otherwise obtain the performance levels.

Additionally or alternatively, in some embodiments, the MPIO driver 112-1 determining the performance level for a given one of the logical storage devices more particularly involves the MPIO driver 112-1 obtaining fabric performance impact notifications (FPINs) characterizing at least one switch fabric of the SAN 104 interconnecting the host device 102-1 and the storage array 105, and the MPIO driver 112-1 determining the performance level based at least in part on the obtained FPINS.

Additionally or alternatively, the MPIO driver 112-1 in some embodiments is further configured to detect a change in an SLO assigned to a given one of the logical storage devices by the storage array 105, and to communicate the detected change in the SLO assigned to the given logical storage device by the storage array 105 from the multi-path layer of the layered software stack of the host device 102-1 to at least one additional layer of the software stack above the multi-path layer.

In the particular SLO example mentioned previously, there are four different SLOs illustratively denoted Diamond, Gold, Silver and Bronze. It is to be appreciated that these and other particular SLOs referred to herein are only examples, and numerous other types and arrangements of SLOs can be used in other embodiments, with a wide variety of different naming conventions.

Such SLOs are illustratively assigned on a per-device basis, where the devices comprise respective logical storage volumes or other types of logical storage devices, although other arrangements are possible. A LUN or logical unit as that term is used herein is an example of a type of logical storage device, also referred to herein as simply a "device."

The storage array 105 implements such SLOs using various methods such as data placement on storage drives of different types, possibly in different storage tiers, and/or using selective IO handling on its front end. In a more particular example of an approach of the latter type, if the storage array detects that response times for IOs with an assigned SLO of Diamond are too high, the storage array illustratively addresses such a condition by delaying the starting of execution for IOs for devices with an assigned SLO of Bronze.

The performance metric utilized to generated performance measurements in some embodiments more particularly comprises a response time metric for IO operations directed to respective ones of the logical storage devices, although additional or alternative performance metrics can be used.

As indicated previously, at least portions of the above-described functionality are performed by the MPIO driver 112-1 of the host device 102-1, utilizing its device tiering logic 115-1 in cooperation with its path selection logic 114-1, although other arrangements are possible. For example, these and other functions referred to herein as being performed by an MPIO driver can in other embodiments be performed at least in part by other parts of a multi-path layer or other host device components.

As noted above, in some embodiments, performance information is obtained directly by the host device 102-1 from storage array 105. Such an arrangement illustratively utilizes an in-band communication mechanism in which one or more commands in a designated storage protocol are sent from the host device 102-1 to the storage array 105.

It is possible in other embodiments that performance information can be obtained by the host device 102-1 indirectly from the storage array 105 utilizing an out-of-band communication mechanism via at least one intermediary device. An intermediary device in such an embodiment illustratively comprises the MPIO management station 116 of system 100. The MPIO management station 116 can comprise a server configured to obtain the performance information directly from the storage array 105. The MPIO management station 116 is illustratively connected directly to the storage array 105 using protocols such as SCSI, Internet SCSI (iSCSI), FC, NVMeoFC and/or others.

The MPIO driver 112-1 on the host device 102-1 illustratively has connectivity to the MPIO management station 116. The MPIO management station 116 in some embodiments implements PowerPath® Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to obtain performance information or other types of information to facilitate automated device tiering for one or more host devices as disclosed herein.

As indicated previously, conventional approaches to logical device management are problematic, in that such approaches can in many situations require substantial communication between a host administrator and a storage administrator.

Illustrative embodiments overcome these and other drawbacks of conventional practice by providing automated device tiering functionality as disclosed herein. Such techniques not only advantageously avoid the need for excessive administrator communication, but also significantly enhance the performance of applications and their associated file systems that utilize the logical storage devices.

A detailed example of an algorithm performed in part by the MPIO driver 112-1 of a given one of the host devices 102-1 ("host"), utilizing device tiering logic 115-1, and interacting with the storage array 105 ("array") and one or more applications of the host, illustratively includes the following steps:

1. LUNs or other logical storage devices ("devices") of the array are provisioned to the host. The devices may or may not have SLOs assigned thereto in the array.
2. The MPIO driver attempts to read SLOs for respective ones of the devices from the array using a VU mode sense command. If the device SLO is not set, zero will be returned (or the mode sense page will be unsupported). The MPIO driver therefore reads the SLO of each device that its host is using and thereby becomes aware of the performance goal of each device. Again, the term "device" as used in the context of the present algorithm refers to a LUN or other logical storage volume or logical storage device of the array. Since the MPIO driver is aware of the SLO value for each device, the MPIO driver in some embodiments can also schedule Diamond IOs before Gold, Silver and/or Bronze IOs, for example, in cases in which congestion is reported by the array.
3. The MPIO driver measures the read performance for each device, by sending multiple read commands, possibly for data of different sizes, and measuring the corresponding response time (RT).
   (a) If no SLO was defined for the device, the read RT measurements provide an average RT for the device.
   (b) If an SLO was defined for the device, the read RT measurements are used to test and verify the SLO as published by the array.
   (c) It is assumed in the present embodiment that the write performance will be approximately the same as the measured read performance, although other embodiments can separately measure both read and write performance.
4. The MPIO driver publishes the performance of each device to one or more upper layers of the host software stack, such as at least one application layer.
5. The MPIO driver repeats the SLO query (e.g., checks whether the SLO has changed) and the RT testing for each device at a selected frequency (e.g., once per minute).
6. The RT may spike due to SAN issues, not just storage issues. The MPIO driver therefore also reports on RT spikes related to SAN issues. For example, the MPIO driver can include FPIN information or other switch congestion notifications in the performance information that it makes available to the one or more upper layers of the host software stack. Additionally or alternatively, the MPIO driver can provide the one or more upper layers with an appropriate warning on detected changes in device performance which may require data relocation between devices due to SAN congestion.
7. One or more applications of the one or more upper layers are configured to read or otherwise obtain the device performance from the multi-path layer comprising the MPIO driver. For example, a database application or an SDNAS application can be configured to read the device performance from the MPIO driver. Such an application is illustratively further configured to utilize the performance levels obtained from the MPIO driver to assign different storage roles to different ones of the devices.

In some embodiments, the MPIO driver reports to the application the RT for each device provisioned to the application, and the application auto-selects the particular devices needed for each role in accordance with their relative performance. For example, in the case of a database application such as an Oracle database application, the database application is illustratively configured to auto-select relatively higher performance devices for use with data files of the database application and relatively lower performance devices for use with log files of the database application. Similarly, in the case of a software-defined storage application such as an SDNAS application, the software-defined storage application is illustratively configured to auto-select relatively higher performance devices for use with data files of the software-defined storage application and relatively lower performance devices for use with control files of the software-defined storage application. Other techniques can be used in other embodiments for utilizing the performance levels obtained from the MPIO driver to assign different storage roles to different ones of the devices.

This particular algorithm is presented by way of illustrative example only, and other embodiments can use other types of algorithms with additional or alternative steps to provide the disclosed functionality. For example, certain steps illustrated as being performed serially can instead be performed at least in part in parallel with one another. The particular steps of the above-described example algorithm, and other algorithms disclosed herein, are illustrative only, and should not be considered limiting in any way.

Such an algorithm in some embodiments is implemented by cooperative interaction of storage controllers 120 of storage array 105 and device tiering logic instances 115 of MPIO drivers 112 of host devices 102.

Illustrative embodiments provide significant advantages over conventional practice. As indicated above, the disclosed automated device tiering techniques in some embodiments not only advantageously avoid the need for excessive administrator communication, but also significantly enhance the performance of applications and their associated file systems that utilize the logical storage devices.

For example, some embodiments illustratively configure a multi-path layer of one or more host devices to measure, verify or otherwise determine logical storage device performance, possibly relative to respective assigned SLOs, and to provide the resulting performance information to one or more higher layers, such as an application layer, for automatic selection of particular devices to fill particular storage roles based at least in part on the performance information.

Such arrangements overcome difficulties which might otherwise arise where host administrators are not aware of logical storage device performance. For example, illustrative embodiments herein can configure an MPIO driver to automatically signal to an application that device performance has changed so that appropriate actions can be taken. Applications can therefore better match devices to roles per measured performance and avoid the need for excessive communication between host and storage administrators.

The portions of the example techniques described above as being performed by a given MPIO driver 112-1 on a corresponding host device 102-1 can be similarly performed by other MPIO drivers 112 on respective other host devices 102. Such MPIO drivers 112 illustratively form a multi-path layer comprising multi-pathing software of the host devices. Other types of host drivers can be used in other embodiments. For example, in some embodiments, at least a portion of the disclosed automated device tiering functionality is carried out using one or more iSCSI drivers, or other types of non-MPIO host drivers.

Additional examples of automated device tiering arrangements will be described elsewhere herein in conjunction with the embodiments of FIGS. 2 through 4. Other types of automated device tiering arrangements can be used in other embodiments.

These and other functions related to automated device tiering that are referred to herein as being performed by or under the control of the MPIO driver 112-1 can in some embodiments be performed at least in part outside of the MPIO driver 112-1, such as in the host device 102-1 generally.

The above-described functions associated with automated device tiering in the MPIO driver 112-1 in some embodiments are carried out at least in part under the control of its device tiering logic 115-1, illustratively operating in cooperation with path selection logic 114-1. For example, the device tiering logic 115-1 is illustratively configured to control performance of one or more steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for automated device tiering.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality. Such conventional MPIO functionality is suitably modified in illustrative embodiments disclosed herein to support automated device tiering.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage devices 106 of the storage arrays 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more VNX®, VMAX®, Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and device tiering logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 204, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

The steps of the FIG. 2 process are illustratively performed at least in part by or under the control of a storage array, operating in conjunction with an MPIO driver of a given host device. For example, portions of the process may be carried out under the control of software, firmware and/or hardware of an instance of device tiering logic deployed within the MPIO driver. Accordingly, the FIG. 2 process may be viewed as an example of an algorithm performed in part by the device tiering logic 115-1 of the MPIO driver 112-1 of host device 102-1, through interaction with storage array 105. Other arrangements of storage array components, host device components and/or other system components can be configured to perform at least portions of one or more of the steps in other embodiments.

In step 200, an MPIO driver of a host device periodically determines performance levels for respective logical storage devices by interacting with a storage array to obtain assigned SLOs and to measure device performance.

For example, in some embodiments the storage array supports multiple distinct SLO levels. As noted above, example SLO levels include Diamond, Gold, Silver and Bronze, illustratively ordered from high to low in terms of response time objective or other type of SLO, although a wide variety of other types of SLO levels and associated performance metrics are possible. The storage array may also monitor performance for IO operations directed to the logical storage devices of the multiple distinct SLO levels. The resulting performance information is also referred to herein as storage-side performance information, as it is generated and maintained by the storage array rather than the host device.

In the present embodiment, the MPIO driver obtains the assigned SLO levels, possibly in combination with storage-side performance information, and also performs its own host-side measurements to measure device performance. The latter performance measurements are also referred to herein as host-side performance information.

In step 202, the MPIO driver exposes the determined performance levels of the logical storage devices to one or more applications of the host device.

In step 204, the application of the host device utilizes the performance levels determined by the MPIO driver to assign different storage roles to respective different ones of the logical storage devices.

Multiple additional instances of the FIG. 2 process may be performed for respective additional host devices that share the storage array. Other embodiments can include multiple storage arrays, with the disclosed functionality for automated device tiering being implemented for each of those storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for automated device tiering. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different automated device tiering arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
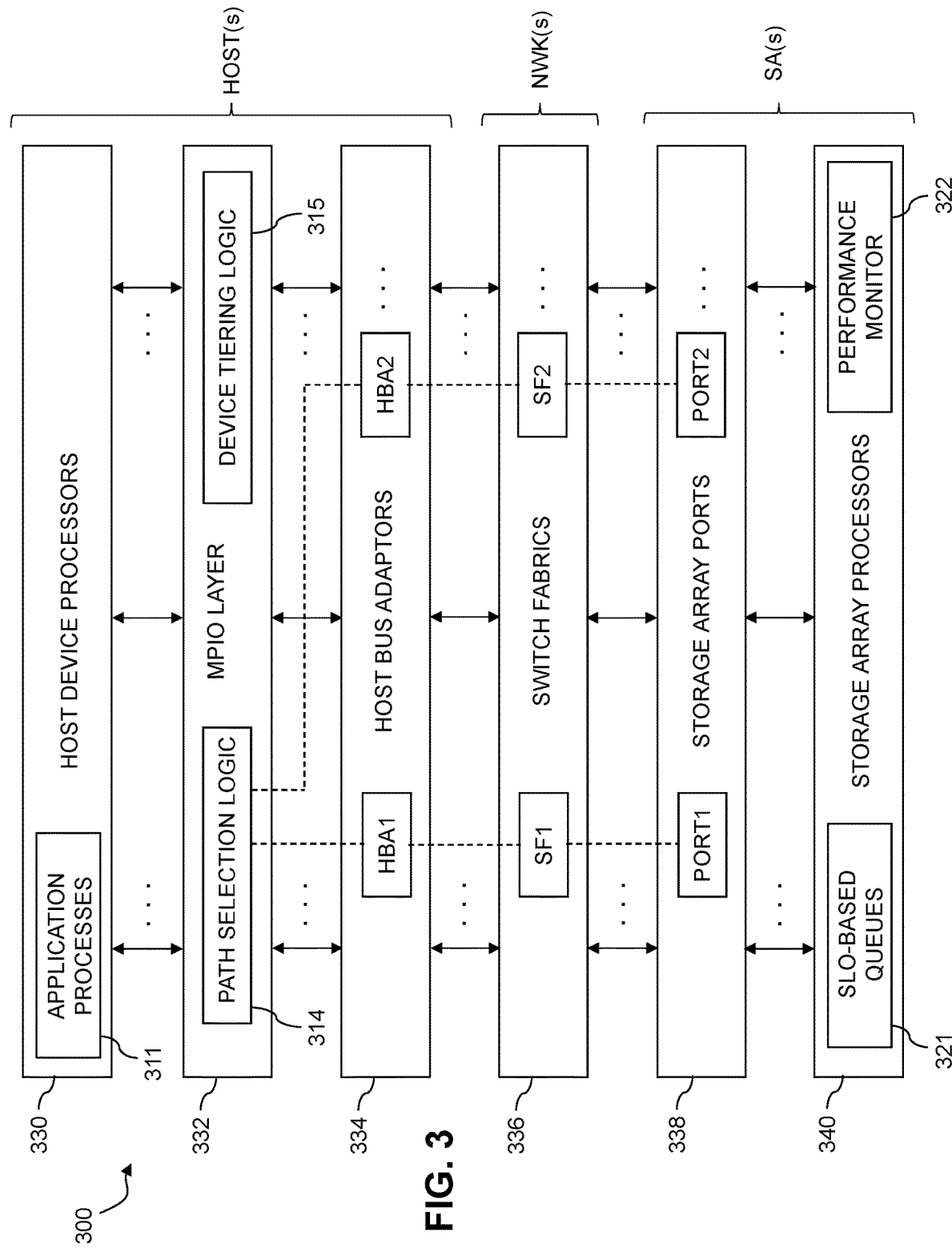
FIG. 3 is a block diagram showing multiple layers of a layered system architecture that includes a multi-path layer with functionality for automated device tiering in an illustrative embodiment.

Referring now to FIG. 3, another illustrative embodiment is shown. In this embodiment, an information processing system 300 comprises host-side elements that include application processes 311, path selection logic 314 and device tiering logic 315, and storage-side elements that include SLO-based queues 321 and performance monitor 322. There may be separate instances of one or more such elements associated with each of a plurality of system components such as host devices and storage arrays of the system 300.

In a manner similar to that described elsewhere herein, storage-side performance information is determined by the performance monitor 322 based at least in part on performance measurements for IO operations associated with the SLO-based queues 321 in one or more storage arrays. Such storage-side performance information is illustratively obtainable by one or more host devices via their respective MPIO drivers and utilized in combination with host-side performance information by the device tiering logic 315 to perform functionality associated with automated device tiering as disclosed herein.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements automated device tiering utilizing one or more MPIO drivers of the MPIO layer 332, and associated instances of device tiering logic 315. The application processes 311 generate IO operations that are processed by the MPIO layer 332 for delivery to the one or more storage arrays. Paths are determined by the path selection logic 314 for sending such IO operations to the one or more storage arrays. These IO operations are illustratively monitored by performance monitor 322 to generate storage-side performance information. Such information is obtained by the one or more MPIO drivers of the MPIO layer and utilized in combination with host-side performance information to perform automated device tiering in the device tiering logic 315. The device tiering logic 315 therefore operates in cooperation with the path selection logic 314 in one or more MPIO drivers of the MPIO layer 332 to perform automated device tiering in the manner disclosed herein, illustratively using performance information obtained by the one or more MPIO drivers from the one or more storage arrays, and additional or alternative host-side performance information generated by the one or more MPIO drivers.

The MPIO layer 332 is an example of what is also referred to herein as a multi-path layer, and comprises one or more MPIO drivers implemented in respective host devices. Each such MPIO driver illustratively comprises respective instances of path selection logic 314 and device tiering logic 315 configured as previously described. Additional or alternative layers and logic arrangements can be used in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays.

It is assumed in this embodiment that the host devices through their respective MPIO drivers and respective instances of device tiering logic 315 provide functionality for automated device tiering, illustratively with involvement of other host device components such as the path selection logic 314.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Additional illustrative embodiments will now be described. It is assumed in these embodiments that the MPIO driver of a given host device provides at least portions of the disclosed automated device tiering functionality, possibly with involvement of one or more other host device components.

Referring now to FIG. 4, an example of a set of performance information 400 maintained by a storage system such as storage array 105 is shown. The performance information 400 is illustratively maintained by the storage array 105 for particular LUNs that are denoted LUN 1, LUN 2, . . . LUN X in the figure. These LUNs may comprise all of the LUNs of the storage array 105, or a designated subset of the LUNs of the storage array 105. Different sets of performance information similar to performance information 400 may be maintained for respective different sets of LUNs of the storage array 105. The performance information 400 may be viewed as one possible example of performance information 122 of storage array 105 in the FIG. 1 embodiment. Similar performance information may be generated by performance monitor 322 in the FIG. 3 embodiment.

The performance information 400 more particularly includes performance measurements for each of the LUNs denoted LUN 1 through LUN X, as well as a corresponding SLO level identifier (ID) as indicated. The performance measurements in some embodiments comprise response time (RT) measurements compiled by the storage array 105 over a designated time period for IO operations directed to the corresponding LUNs. Additional or alternative performance metrics that can be used in generating the performance measurements include, for example, at least one of a write count, a write pending count and a bandwidth consumption for IO operations directed to the corresponding LUNs.

The performance information 400 is utilized in conjunction with SLO-based queues 121 of the storage array 105 in detecting write pressure conditions and implementing associated automated device tiering as disclosed herein.

The particular performance information arrangement shown in FIG. 4 is only an example, and numerous other types and arrangements of performance information can be maintained by a storage system in other embodiments. Terms such as "performance information" as used herein are intended to be broadly construed.

As indicated above, the MPIO driver of a given one of the host devices 102 can obtain performance information from the storage array 105 by sending commands to the storage array 105, in the manner previously described.

The performance information 400 is illustratively stored in a storage array memory accessible to a multi-path layer of the host device. Other types of data structures can be used in other embodiments.

On the host side, at least portions of such performance information obtained from the storage array and characterizing one or more logical storage devices are illustratively stored in a data structure of a kernel-space portion of the MPIO driver 112-1, although other storage arrangements with other types of data structures can be used.

In some embodiments, an MPIO driver obtains performance information directly from a storage array, through interaction with the storage array as described elsewhere herein. For example, MPIO driver 112-1 is illustratively configured to obtain the performance information directly from the storage array 105 utilizing an in-band communication mechanism in which one or more commands in a designated storage protocol are sent from the MPIO driver 112-1 or another host device component to the storage array 105.

However, it is possible in some embodiments that one or more MPIO drivers of one or more host devices can obtain the performance information other than through direct communication with the storage array. Such arrangements illustratively involve obtaining the connectivity information indirectly from the storage array utilizing an out-of-band communication mechanism via at least one intermediary device, such as the MPIO management station 116, which may comprise one or more servers.

Although the FIG. 4 example illustrates storage-side performance information, in some embodiments similar performance information is determined and maintained by MPIO drivers of one or more host devices. Such information is also referred to herein as host-side performance information.

The above-described processes, algorithms and other features and functionality disclosed herein are presented by way of illustrative example only, and other embodiments can utilize additional or alternative arrangements.

Also, as mentioned previously, different instances of the above-described processes, algorithms and other automated device tiering techniques can be performed by different MPIO drivers in different host devices, or using other types of host drivers, such as, for example, iSCSI drivers.

The particular automated device tiering arrangements described above are therefore presented by way of illustrative example only. Numerous alternative arrangements of these and other features can be used in implementing the automated device tiering in other illustrative embodiments.

As indicated previously, illustrative embodiments disclosed herein can provide a number of significant advantages relative to conventional arrangements.

It is to be appreciated that the particular advantages described herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell Technologies.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and device tiering logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, device tiering logic and additional or alternative components. Also, the particular configurations of system and device elements and associated processing operations illustratively shown in the drawings can be varied in other embodiments. For example, a wide variety of different host device configurations and associated automated device tiering arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
wherein the at least one processing device is configured:
for each of a plurality of logical storage devices of a storage system, to determine in a multi-path layer of a layered software stack of a host device a performance level for that logical storage device, the host device being configured to communicate with the storage system over a network, the multi-path layer determining the performance levels for respective ones of the logical storage devices at least in part through interaction with the storage system over the network;
to communicate in the host device the performance levels for respective ones of the logical storage devices from the multi-path layer of the layered software stack of the host device to at least one additional layer of the layered software stack above the multi-path layer in the host device; and
to select in the host device particular ones of the logical storage devices for assignment to particular storage roles in the at least one additional layer based at least in part on the communicated performance levels;
wherein the additional layer of the layered software stack above the multi-path layer comprises an application layer comprising at least one application executing on the host device and configured to communicate with the multi-path layer to obtain the performance levels therefrom;
wherein determining the performance levels for respective ones of the logical storage devices at least in part through interaction with the storage system over the network comprises sending at least one command from the multi-path layer to the storage system, in a designated storage access protocol, to obtain from the storage system at least a service level objective stored for a given one of the logical storage devices in at least one data structure implemented in the storage system, the at least one data structure implemented in the storage system storing different service level objectives for respective different ones of the logical storage devices, the obtained service level objective being utilized by the multi-path layer, in combination with one or more performance measurements made by the multi-path layer, to determine the performance level for the given one of the logical storage devices; and
wherein the selecting in the host device of particular ones of the logical storage devices for assignment to particular storage roles is performed by the at least one application utilizing the communicated performance levels obtained from the multi-path layer.

2. The apparatus of claim 1 wherein the at least one processing device comprises at least a portion of the host device.

3. The apparatus of claim 1 wherein the multi-path layer comprises at least one multi-path input-output driver of the host device.

4. The apparatus of claim 1 wherein determining the performance level for the given one of the logical storage devices comprises:
measuring response times for respective ones of multiple read operations directed by the multi-path layer to the given logical storage device; and
determining the performance level based at least in part on the measured response times.

5. The apparatus of claim 1 wherein determining the performance level for the given one of the logical storage devices comprises:
measuring read performance for the given logical storage device;
comparing the measured read performance to the service level objective; and
determining the performance level based at least in part on a result of the comparing.

6. The apparatus of claim 1 wherein obtaining the service level objective for the given logical storage device from the storage system comprises:
sending a designated command to the storage system; and
receiving the service level objective for the given logical storage device in response to the designated command;
wherein the designated command is sent from the multi-path layer to the storage system utilizing the designated storage access protocol.

7. The apparatus of claim 1 wherein at least one application of the application layer is configured to automatically select a particular one of the logical storage devices for use with a particular storage role of that application based at least in part on the performance levels communicated for respective ones of the logical storage devices from the multi-path layer.

8. The apparatus of claim 1 wherein at least one application of the application layer is configured to automatically select a first one of the logical storage devices having a first performance level for storing one or more application files of a first type and to automatically select a second one of the logical storage devices having a second performance level lower than the first performance level for storing one or more application files of a second type different than the first type.

9. The apparatus of claim 8 wherein the application comprises a database application, and further wherein the one or more application files of the first type comprise data files of the database application and the one or more application files of the second type comprise log files of the database application.

10. The apparatus of claim 8 wherein the application comprises a software-defined storage application, and further wherein the one or more application files of the first type comprise data files of the software-defined storage application and the one or more application files of the second type comprise control files of the software-defined storage application.

11. The apparatus of claim 1 wherein communicating the performance levels for respective ones of the logical storage devices from the multi-path layer of the layered software stack of the host device to at least one additional layer of the layered software stack comprises publishing the performance levels from the multi-path layer to the at least one additional layer.

12. The apparatus of claim 1 wherein determining the performance level for the given one of the logical storage devices comprises:
obtaining fabric performance impact notifications characterizing at least one switch fabric of a network interconnecting the host device and the storage system; and
determining the performance level based at least in part on the obtained fabric performance impact notifications.

13. The apparatus of claim 1 wherein the at least one processing device is further configured:
to detect, in the multi-path layer of the layered software stack of the host device, a change in the service level objective stored for the given one of the logical storage devices by the storage system; and to communicate the detected change in the service level objective stored for the given logical storage device by the storage system from the multi-path layer to at least one additional layer of the layered software stack above the multi-path layer.

14. A computer program product comprising a non-transitory processor-readable storage medium having stored therein program code of one or more software programs, wherein the program code, when executed by at least one processing device comprising a processor coupled to a memory, causes the processing device:

for each of a plurality of logical storage devices of a storage system, to determine in a multi-path layer of a layered software stack of a host device a performance level for that logical storage device, the host device being configured to communicate with the storage system over a network, the multi-path layer determining the performance levels for respective ones of the logical storage devices at least in part through interaction with the storage system over the network;

to communicate in the host device the performance levels for respective ones of the logical storage devices from the multi-path layer of the layered software stack of the host device to at least one additional layer of the layered software stack above the multi-path layer in the host device; and to select in the host device particular ones of the logical storage devices for assignment to particular storage roles in the at least one additional layer based at least in part on the communicated performance levels;

wherein the additional layer of the layered software stack above the multi-path layer comprises an application layer comprising at least one application executing on the host device and configured to communicate with the multi-path layer to obtain the performance levels therefrom;

wherein determining the performance levels for respective ones of the logical storage devices at least in part through interaction with the storage system over the network comprises sending at least one command from the multi-path layer to the storage system, in a designated storage access protocol, to obtain from the storage system at least a service level objective stored for a given one of the logical storage devices in at least one data structure implemented in the storage system, the at least one data structure implemented in the storage system storing different service level objectives for respective different ones of the logical storage devices, the obtained service level objective being utilized by the multi-path layer, in combination with one or more performance measurements made by the multi-path layer, to determine the performance level for the given one of the logical storage devices; and wherein the selecting in the host device of particular ones of the logical storage devices for assignment to particular storage roles is performed by the at least one application utilizing the communicated performance levels obtained from the multi-path layer.

15. The computer program product of claim 14 wherein at least one application of the application layer is configured to automatically select a particular one of the logical storage devices for use with a particular storage role of that application based at least in part on the performance levels communicated for respective ones of the logical storage devices from the multi-path layer.

16. The computer program product of claim 14 wherein at least one application of the application layer is configured to automatically select a first one of the logical storage devices having a first performance level for storing one or more application files of a first type and to automatically select a second one of the logical storage devices having a second performance level lower than the first performance level for storing one or more application files of a second type different than the first type.

17. A method comprising:

for each of a plurality of logical storage devices of a storage system, determining in a multi-path layer of a layered software stack of a host device a performance level for that logical storage device, the host device being configured to communicate with the storage system over a network, the multi-path layer determining the performance levels for respective ones of the logical storage devices at least in part through interaction with the storage system over the network;

communicating in the host device the performance levels for respective ones of the logical storage devices from the multi-path layer of the layered software stack of the host device to at least one additional layer of the layered software stack above the multi-path layer in the host device; and selecting in the host device particular ones of the logical storage devices for assignment to particular storage roles in the at least one additional layer based at least in part on the communicated performance levels;

wherein the additional layer of the layered software stack above the multi-path layer comprises an application layer comprising at least one application executing on the host device and configured to communicate with the multi-path layer to obtain the performance levels therefrom;

wherein determining the performance levels for respective ones of the logical storage devices at least in part through interaction with the storage system over the network comprises sending at least one command from the multi-path layer to the storage system, in a designated storage access protocol, to obtain from the storage system at least a service level objective stored for a given one of the logical storage devices in at least one data structure implemented in the storage system, the at least one data structure implemented in the storage system storing different service level objectives for respective different ones of the logical storage devices, the obtained service level objective being utilized by the multi-path layer, in combination with one or more performance measurements made by the multi-path layer, to determine the performance level for the given one of the logical storage devices;

wherein the selecting in the host device of particular ones of the logical storage devices for assignment to particular storage roles is performed by the at least one application utilizing the communicated performance levels obtained from the multi-path layer; and wherein the method is performed by at least one processing device comprising a processor coupled to a memory.

18. The method of claim 17 wherein at least one application of the application layer is configured to automatically select a particular one of the logical storage devices for use with a particular storage role of that application based at least in part on the performance levels communicated for respective ones of the logical storage devices from the multi-path layer.

19. The method of claim 17 wherein at least one application of the application layer is configured to automatically select a first one of the logical storage devices having a first performance level for storing one or more application files of a first type and to automatically select a second one of the logical storage devices having a second performance level lower than the first performance level for storing one or more application files of a second type different than the first type.

20. The method of claim 17 wherein communicating the performance levels for respective ones of the logical storage devices from the multi-path layer of the layered software stack of the host device to at least one additional layer of the layered software stack comprises publishing the performance levels from the multi-path layer to the at least one additional layer.

* * * * *